(12) United States Patent
Seguie

(10) Patent No.: US 8,571,483 B2
(45) Date of Patent: Oct. 29, 2013

(54) INTERACTIVE CONTROL OF COMMUNICATION TERMINALS

(75) Inventor: Alain Seguie, Louailles (FR)

(73) Assignee: ST-Ericsson SA, Plan-les-Ouates ( * ) Notice: Subject to any disclaimer, the term of this patent is extended or adjusted under 35 U.S.C. 154(b) by 51 days.

(21) Appl. No.: 13/322,876

(22) PCT Filed: Jun. 3, 2010

(86) PCT No.: PCT/EP2010/057779
§ 371 (c)(1),
(2), (4) Date: Nov. 28, 2011

(87) PCT Pub. No.: WO2010/139757
PCT Pub. Date: Dec. 9, 2010

(65) Prior Publication Data
US 2012/0115544 A1    May 10, 2012

(30) Foreign Application Priority Data
Jun. 3, 2009  (FR) .................... 09 53672

(51) Int. Cl.
*H04B 7/00* (2006.01)
*H04B 1/00* (2006.01)
*H04M 3/00* (2006.01)
*G08B 1/08* (2006.01)

(52) U.S. Cl.
USPC ............ 455/66.1; 455/70; 455/420

(58) Field of Classification Search
USPC ............. 455/418, 419, 420, 39, 66.1, 68, 70, 455/352, 353, 355; 340/539.1, 539.22, 340/539.26
See application file for complete search history.

(56) References Cited

U.S. PATENT DOCUMENTS

| | | | |
|---|---|---|---|
| 2003/0153240 A1* | 8/2003 | DeJule | .................... 446/227 |
| 2004/0253926 A1 | 12/2004 | Gross | |
| 2007/0082700 A1 | 4/2007 | Landschaft et al. | |

FOREIGN PATENT DOCUMENTS

| | | |
|---|---|---|
| EP | 1186491 A1 | 3/2002 |
| WO | 2004079684 A1 | 9/2004 |
| WO | 2006043882 A1 | 4/2006 |

OTHER PUBLICATIONS

Patent Cooperation Treaty International Search Report and Written Opinion of PCT/EP2010/057779; Alain Barbelanne; Sep. 3, 2010; 8 pages.
Institut National De La Propriete Industrielle; Rapport de Recherche Preliminaire; French Search Report and Written Opinion; Alain Barbelanne; Dec. 14, 2009; 7 pages.

* cited by examiner

*Primary Examiner* — Nguyen Vo
(74) *Attorney, Agent, or Firm* — Howison & Arnott, L.L.P.

(57) ABSTRACT

An electronic circuit is proposed for a wireless telephone terminal, configured to allow the use of devices present in another remote terminal with which it can communicate.

7 Claims, 4 Drawing Sheets

INTERACTIVE CONTROL OF COMMUNICATION TERMINALS

CROSS-REFERENCE TO RELATED APPLICATIONS

This application is a U.S. National Phase application submitted under 35 U.S.C. §371 of Patent Cooperation Treaty application serial no. PCT/EP2010/057779, filed Jun. 3, 2010, and entitled INTERACTIVE CONTROL OF COMMUNICATION TERMINALS, which application claims priority to French patent application serial no. FR 09 53672, filed Jun. 3, 2009, and entitled INTERACTIVE CONTROL OF COMMUNICATION TERMINALS.

Patent Cooperation Treaty application serial no. PCT/EP2010/057779, published as WO 2010/139757, and French patent application serial no. FR 09 53672, are incorporated herein by reference.

TECHNICAL FIELD

The present invention relates in general to the domain of integrated circuits used in the domain of radiocommunications.

More particularly, it concerns the function of the remote control of a second terminal by a first terminal, via a wireless communications network.

The invention has applications particularly in the integrated circuits equipping wireless mobile telephones.

BACKGROUND

These last few years have seen a significant growth in the technical capabilities of wireless communications terminals. Today, most mobile terminals have, in addition to the ability to realize voice communications, the ability to capture images, video, measure temperature, determine the location of the terminal, capture movement, etc.

These features, coupled with the development of wireless communications networks, offer the possibility for new services, such as instant communication of information available in the terminal due to these features.

In addition, these improved terminals are widely distributed today and are constantly in operation (at least in standby mode).

The terminals of the prior art comprise devices such as image sensors, temperature sensors, and movement sensors. These devices are exclusively reserved for use by the terminal.

SUMMARY

The invention embodiments aim to provide a circuit which notably allows the use by a terminal of devices present in a remote terminal with which it is communicating.

For this purpose, a first aspect of the invention proposes an electronic circuit for a wireless telephone terminal arranged to cooperate with a radiofrequency communication unit of the terminal, and with a set of devices of the terminal comprising at least one sensor, the circuit being configured, in a first mode of operation, to:
  a) collect data issuing from a first sensor of the terminal,
  b) analyze the evolution over time of data issuing from the first sensor in order to detect the occurrence of an event outside the terminal, based on this evolution,
  c) initiate a first communication, via the radiofrequency communication unit, with a wireless telephone network supporting wireless communications with the terminal, and, in the context of said first communication:
  d) command the communication unit to send to a remote terminal, via the wireless telephone network, a signal indicating the detection of the occurrence of the event,
  e) collect data issuing from the first or from a second sensor of the terminal, and
  f) engage in a second communication with the wireless telephone network, via the communication unit, and in the context of said second communication:
     i) send collected data issuing from the first or second sensor,
     ii) send a list of sensors from the set of sensors of the terminal, and
     iii) receive a signal identifying a sensor in the list in order to control its use in the transmission of data in the context of the second communication.

In this mode of operation, the terminal operates in slave mode, being controlled remotely by the network or by another terminal (master) with which the second communication is established.

The second communication is typically initiated by the remote terminal in master mode.

The master terminal can be fixed or wireless.

The set of devices can comprise for example: a microphone, a motion sensor, a camera, an accelerometer, a thermometer, a barometer, a smoke detector, etc. This list is not limiting, because the set can comprise other sensors or devices for detecting and/or measuring information.

Control is flexible, because it is possible to choose the sensors used.

For example, the sensors are integrated with the terminal.

An event can for example consist of exceeding thresholds for sound, acceleration, movement, and so on. Other events can be envisaged. One can also envisage defining a complex event, such as the combination of several basic events: for example exceeding both a sound level threshold and a temperature threshold.

In some embodiments, one can therefore use communication terminals in an interactive manner. This offers the possibility of new services based on this interactive approach.

In some embodiments of the invention, the set of devices additionally comprises at least one interface device with a user, with the circuit additionally being configured to receive in the context of the first communication, via the communication unit, a command to activate or deactivate the interface device.

In this manner it is possible, via the interface device, to activate or deactivate at least one sensor in order to obtain certain information. For example, one can choose to receive information from a microphone and/or a camera, or other device.

The circuit can additionally be configured to operate in another mode of operation, as a master terminal controlling a slave terminal. The circuit is then additionally configured to, in this second mode of operation to:
  a) receive from a remote terminal, via the wireless telephone network, a signal indicating the occurrence of an event at the remote terminal,
  b) send a request to the remote terminal, via the wireless telephone network, to receive data issuing from a sensor of the remote terminal, and
  c) receive the data.

The invention permits many applications, and especially opens the way for new services. For example, it allows using a mobile telephone as a remote monitoring device.

According to other aspects, the invention also concerns a communication terminal comprising a circuit according to the first aspect, a control method for a circuit according to the first aspect, and a computer program comprising instructions for implementing this process.

These objects present at least the same advantages as those associated with the circuit according to the first aspect.

BRIEF DESCRIPTION OF THE DRAWINGS

Other features and advantages of the invention will become apparent from the following description. This description is purely illustrative and is to be read in light of the attached drawings, in which.

DETAILED DESCRIPTION

Figure 1:
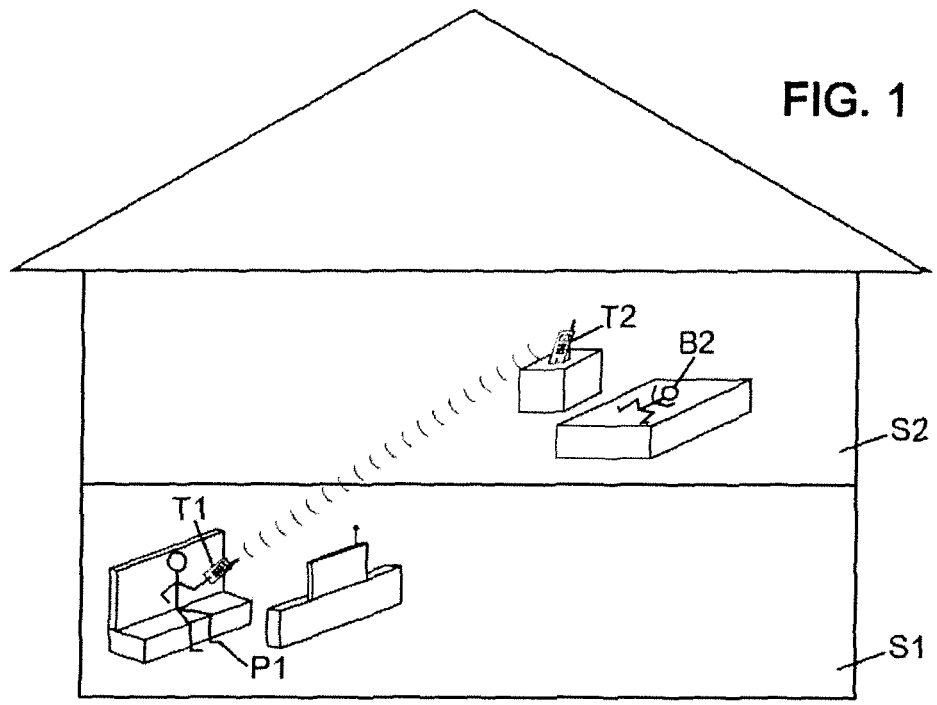
FIG. 1 illustrates the general context of a possible implementation of embodiments of the invention.

The general context of a possible use of a terminal according to embodiments of the invention is described below, with reference to FIG. 1. In this figure, a user P1 of a terminal T1 is represented in a room S1 of a house. Also represented is a very young child B2 in another room S2 of the house.

Let us assume that P1 wants to monitor B2 remotely and possibly interact with B2.

For this purpose, P1 has placed a terminal T2 near B2. This terminal T2 has sensors, particularly a microphone, a camera, and interface devices, in particular a speaker. P1 can configure the terminal T2 from his terminal T1 so that it delivers a warning signal to him when a level of sound is reached, which P1 can interpret as the crying of B2. When this alert message is received by T1 from T2, P1 may want to see, by means of the camera, whether B2 is in fact crying. If he observes that the baby is in fact crying, he could then take control of the speaker to calm B2 and then join him.

One can of course consider other applications. For example, if a terminal is placed in a car, it can be possible for a user away from the car to be alerted in case of an intrusion into the vehicle (suspicious noise), then request a view of what is actually happening.

In another application, a farmer can use the invention to monitor temperature changes in a field. For this purpose, he simply has in his possession a terminal of the invention equipped with sensors, and configures it so he is alerted when the temperature falls below a certain threshold. In this case, the farmer can request the measurement of other parameters accessible via the sensors.

Figure 2:
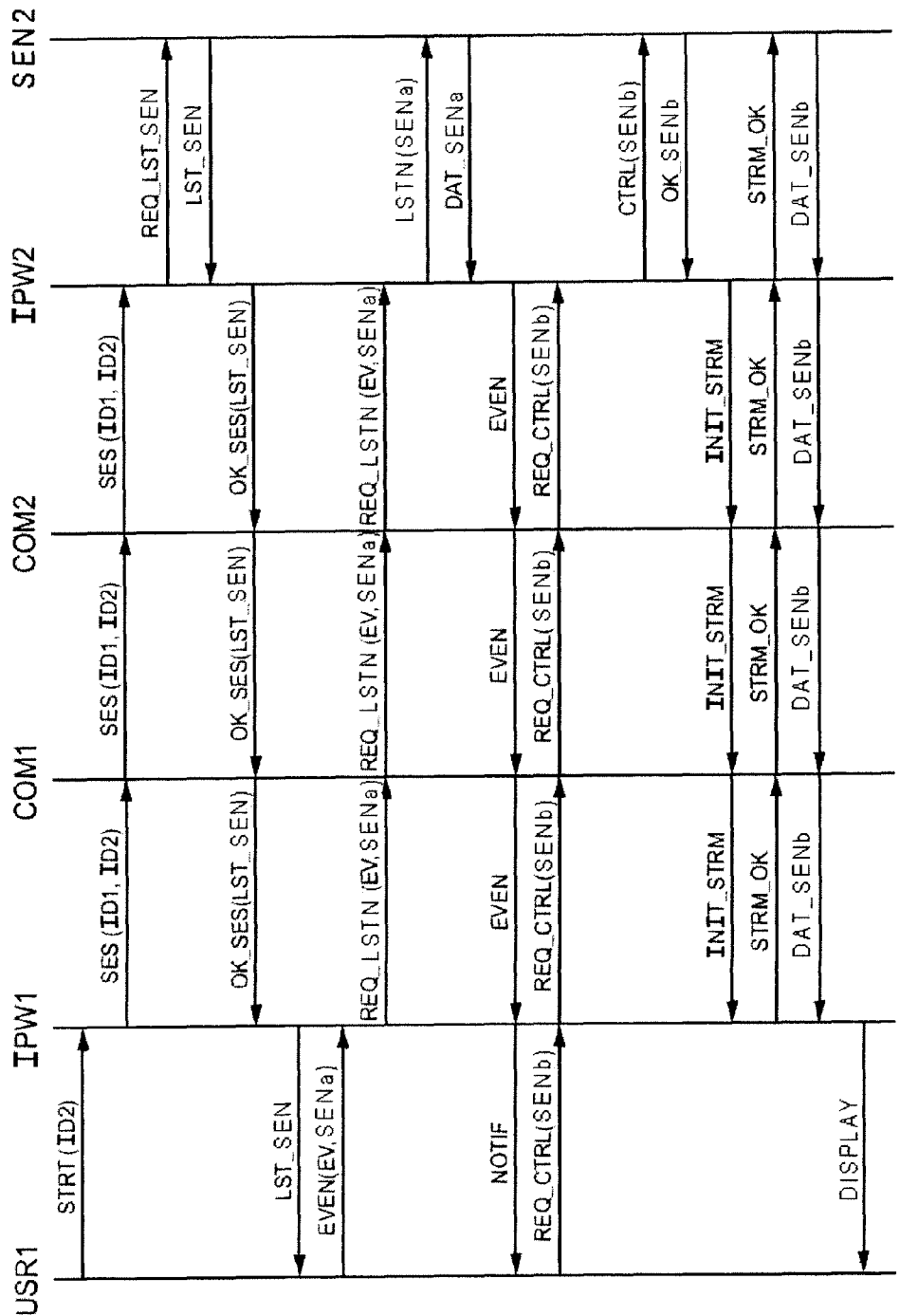
FIG. 2 illustrates the different interactions between the two terminals in order to implement an embodiment of the invention.

Different exchanges between the two terminals in order to implement an embodiment of the invention are now described, with reference to FIG. 2.

FIG. 2 shows the user of the first terminal (master) USR1, the management unit IPW1 of the first terminal, the communication unit COM1 of the first terminal and the unit COM2 of the second terminal (slave), the management unit of the second terminal IPW2, and an interface unit interfacing with the set of sensors SEN2 available in the terminal.

First, USR1 requests the start of a control session by means of an interface, for example a keyboard or a touch screen. To do this he indicates the identifier ID2 of the terminal to be controlled, for example a telephone number. This operation is illustrated by the message STRT(ID2).

This query is managed by the management unit IPW1 which sends a request to the second terminal to open a session SES(ID1, ID2), by means of the communication unit COM1. This request is received by the communication unit COM2 of the second terminal, which sends it to the management unit IPW2 of the second terminal.

Then, in a process not represented, it can be determined if the request can be accepted, for example by comparing the identifier of the first terminal with a list comprising the identifiers of authorized terminals. If the request is refused, a refusal message is sent to the first terminal.

Back to FIG. 2, if the request is accepted, SEN2 is sent a request REQ_LST_SEN to receive a list LST_SEN of sensors available and able to be controlled.

Then, if there is at least one sensor available, IPW2 opens a control session and returns, via the communication units COM1 and COM2, a session open message comprising the list OK_SES(LST_SEN). If no sensor is available a failure message is returned.

IPW1 then presents to USR1 the list of sensors and USR1 defines an event EV to be monitored and chooses one or more sensors SENa for the detection. This definition and this selection are illustrated in the diagram by EVEN(EV, SENa).

IPW receives the message. It then sends to the second terminal, via the communication units COM1 and COM2, a request to detect the event REQ_LSTN(SENa, EV).

Upon receipt of the request, IPW2 activates SENa by the message LSTN(SENa), and begins listening in order to receive the data DAT_SENa regularly issuing from SENa in order to determine whether the event EV is occurring.

When the event EV occurs, IPW2 sends an alert message EVEN via COM1 and COM2 to IPW2. IPW2 then notifies USR1 of the information for example by an audible message NOTIF, or other means.

USR1 can then decide to select another sensor to obtain more accurate knowledge of the event by another sensor. For example, he may want to obtain a live video of what is happening. To do this, he sends the request REQ_CTRL (SENb) to select a video camera SENb. This request is sent to IPW2 via COM1 and COM2.

IPW2 activates SENb via the interface unit of the sensors SEN2 (CTRL(SENb) message). Once activated, SENb returns an activation message OK_SENb. IPW2 then initiates a video communication stream between the terminals (messages INIT_STRM and STRM_OK).

The video data DAT_SENb are then sent to IPW1 which displays them for USR1 via a screen (DISPLAY).

In a process not described, USR2 ends the session. Before he does so he can select other sensors, stop the stream and resume monitoring, reconfigure the event, the sensors, and so on.

Figure 3:
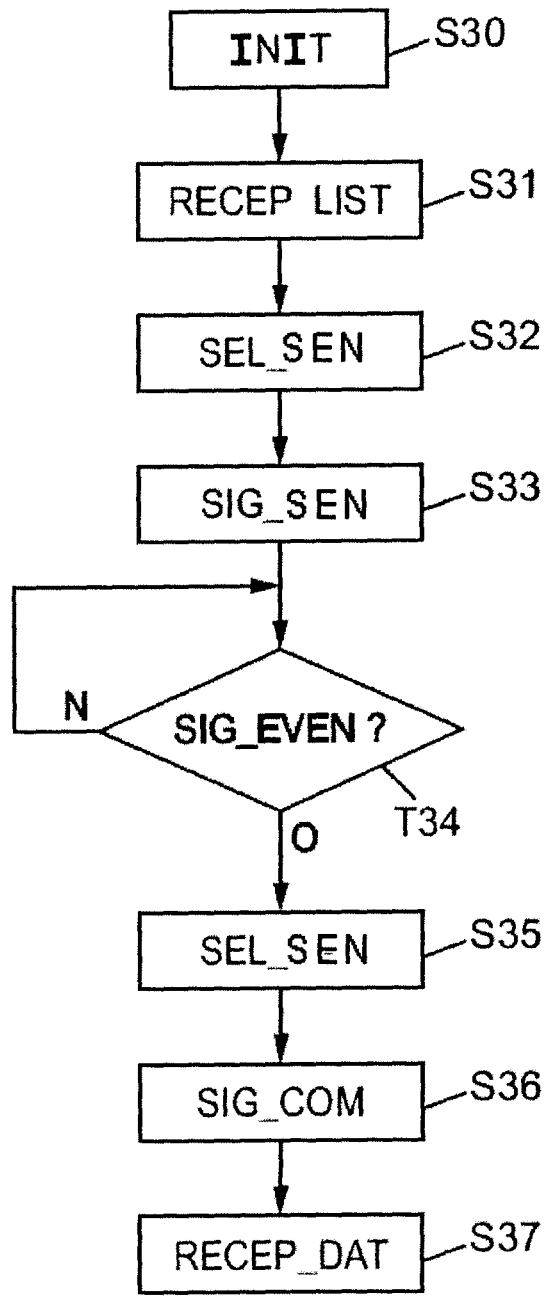
FIG. 3 illustrates the steps applied by the first terminal operating in master mode in one embodiment of the invention.
Figure 4:
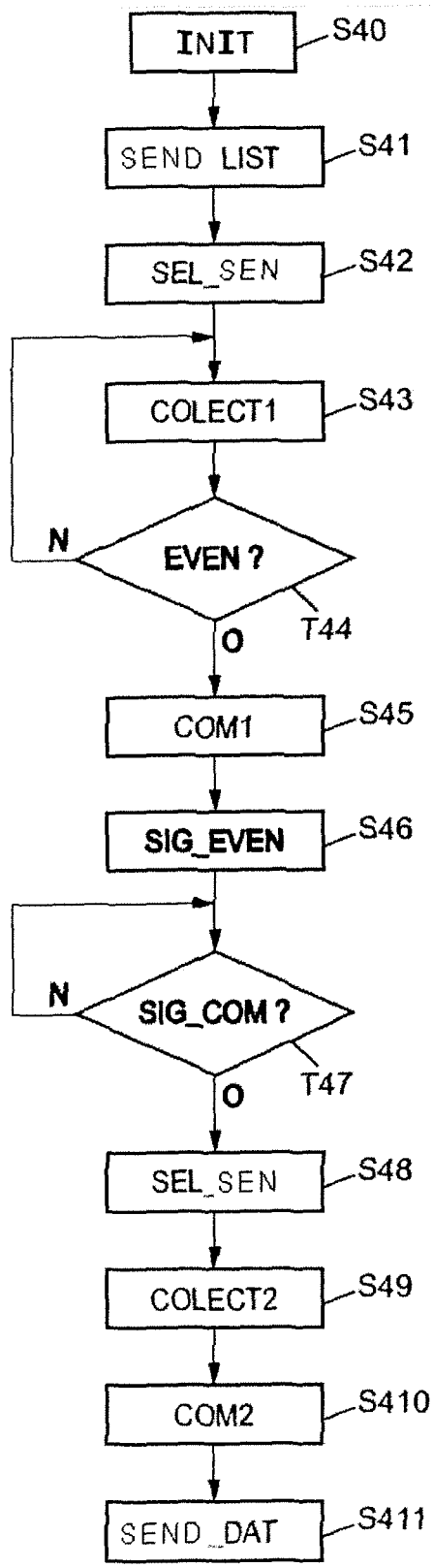
FIG. 4 illustrates the steps applied by the second terminal operating in slave mode in this embodiment of the invention, and FIG. 5 schematically illustrates a terminal according to an embodiment of the invention.

The first and the second terminal each have a specific function. FIGS. 3 and 4 respectively summarize the steps implemented by each in another more general embodiment of the invention.

FIG. 3 is a flow chart illustrating the steps taken by the controlling first terminal.

The first step S30 is an initiation of the control session. It consists of making contact with the second terminal and configuring the communication. Then in a step S31, the first terminal receives from the second terminal a confirmation that the session is initialized and a list of sensors available and able to be controlled at the second terminal.

Then, during the step S32, the terminal selects a sensor from the list in order to perform the event monitoring. A signal indicating the choice of sensor and the event to be monitored is then sent to the other terminal during the step S33.

In one variation, all the sensors in the list can already be activated by the second terminal, and the latter then monitors a certain number of pre-established events, such that the first terminal only has to scan for the receipt of a signal indicating the occurrence of an event.

The first terminal puts itself into a listening mode, to scan for the receipt of a message indicating the occurrence of the event to be monitored (step T34).

When the first terminal receives this event signal, it selects a sensor from the list during the step S35, then asks to receive information from this sensor during the step S36.

The terminal then begins listening to the data from the sensor selected during the step S37.

The steps implemented by the second terminal in this embodiment are described with reference to FIG. 4.

The step S40 corresponds to the step of initializing the session with the first terminal.

The step S41 corresponds to the inventory of the available sensors, their activation in order to detect the occurrence of a particular event, and the sending of the list of available sensors to the first terminal.

Upon receipt of a signal indicating the choice of sensor by the first terminal and of the event to be monitored during the step S42, the second terminal begins to listen to the selected sensor during step S43, in order to detect the event during the step T44.

If the event occurs, a first communication is initiated during the step S45, in order to send a signal to the first terminal to notify it during the step S46.

The second terminal then begins to listen to the first terminal during the step T47, in order to receive a sensor control signal (corresponding to the signal sent by the first terminal during the step S36 described with reference to FIG. 3). During the step S48, the second terminal receives the request from the first terminal to receive the data issuing from a selected sensor. The second terminal then initiates a second communication during the step S410 in order to send these data during the step S411.

The communications in steps S45 and S410 can each be of different types. For example, the first communication can be in packet-switching mode and the second communication can be in circuit-switching mode, in order to best adapt the communication to the type of data to be communicated.

Figure 5:
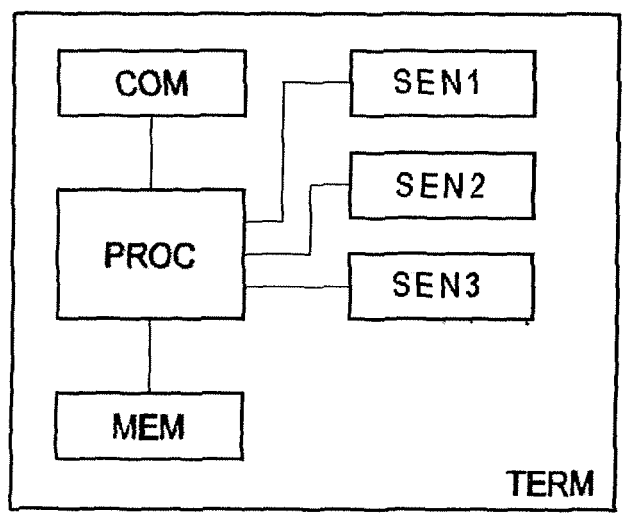

FIG. 5 illustrates a terminal TERM according to an embodiment of the invention. This terminal can selectively act as either a master terminal or a slave terminal. The terminal of this embodiment comprises a communication unit COM for communicating with other terminals via a wireless communications network, a processing unit PROC comprising a processor for implementing a method according to the invention, and a memory MEM for storing a computer program according to the invention. The terminal additionally comprises sensors SEN1, SEN2, and SEN3. Of course, these sensors are not necessary when it is used as a master terminal only.

A computer program can be realized on the basis of an algorithm according to FIGS. 2 to 4. Such a program comprises instructions which, when the program is loaded into memory and executed by a processor, are suitable for implementing the steps of the corresponding process.

Of course, the invention is not limited to the embodiments described above, but extends to other variants. In particular, one can envisage numerous applications and embodiments.

The invention claimed is:

1. An electronic circuit for a wireless telephone terminal, arranged to cooperate with a radiofrequency communication unit of the terminal, and with a set of devices of the terminal comprising at least one sensor, the circuit being configured, in a first mode of operation, to:
   collect data issuing from a first sensor of the terminal;
   analyze an evolution over time of data issuing from the first sensor in order to detect the occurrence of an event outside the terminal, based on this evolution;
   initiate a first communication, via the communication unit, with a wireless telephone network supporting wireless communications with the terminal, and, in the context of said first communication:
      command the communication unit to send to a remote terminal, via the wireless telephone network, a signal indicating detection of the occurrence of the event; and
      collect data issuing from the first or from a second sensor of the terminal; and
   engage in a second communication with the wireless telephone network, via the communication unit, and in the context of said second communication:
      send collected data issuing from the first or second sensor,
      send a list of sensors from the set of sensors of the terminal, and
      receive a signal identifying a sensor in the list in order to control its use in the transmission of data in the context of the second communication.

2. A circuit according to claim 1, wherein the set of devices additionally comprises at least one interface device for use by a user, the circuit being additionally configured to receive via the communication unit, in the context of the first communication, a command to activate or deactivate the interface device.

3. A circuit according to claim 1, additionally configured, in a second mode of operation, to:
   receive from a remote terminal, via the wireless telephone network, a signal indicating the occurrence of an event at the remote terminal,
   send a request to the remote terminal, via the wireless telephone network, to receive data issuing from a sensor of the remote terminal, and receive the data.

4. A circuit according to claim 3, additionally configured to:
   receive a list of sensors from a remote terminal,
   select a sensor from the list,
   send a signal identifying the selected sensor in order to receive data issuing from this sensor.

5. A communication terminal comprising:
   a communication unit for communicating with another communication terminal via a wireless telephone network;
   a memory;
   a set of devices comprising at least one sensor; and
   a circuit according to claim 1.

6. A method for controlling an electronic circuit for a wireless telephone terminal arranged to cooperate with a radiofrequency communication unit of the terminal, and with a set of devices of the terminal comprising at least one sensor, comprising:

collecting data issuing from a first sensor of the terminal;
analyzing an evolution over time of data issuing from the first sensor in order to detect an occurrence of an event outside the terminal, based on this evolution;
initiating a first communication, via the communication unit, with a wireless telephone network supporting wireless communications with the terminal, and, in the context of the first communication:
   commanding the communication unit to send to a remote terminal, via the wireless telephone network, a signal indicating detection of the occurrence of the event; and
   collecting data issuing from the first or from a second sensor of the terminal; and
engaging in a second communication with the wireless telephone network, via the communication unit, and in the context of said second communication:
   sending collected data issuing from the first or second sensor;
   sending a list of sensors from the set of sensors of the terminal; and
   receiving a signal identifying a sensor in the list in order to control its use in the transmission of data in the second communication.

7. A method according to claim 6, wherein the set of devices additionally comprises at least one interface device for use by a user, with the method additionally comprising, in the context of the first communication, receiving via the communication unit, a command to activate or deactivate the interface device.

* * * * *